(12) United States Patent
McCoy

(10) Patent No.: US 9,931,898 B2
(45) Date of Patent: Apr. 3, 2018

(54) SAFETY CHAIN TIE DOWN APPARATUS

(71) Applicant: Cequent Performance Products, Inc., Plymouth, MI (US)

(72) Inventor: Richard W. McCoy, Granger, IN (US)

(73) Assignee: HORIZON GLOBAL AMERICAS INC., Plymouth, MI (US)

(*) Notice: Subject to any disclaimer, the term of this patent is extended or adjusted under 35 U.S.C. 154(b) by 194 days.

(21) Appl. No.: 14/504,763

(22) Filed: Oct. 2, 2014

(65) Prior Publication Data
US 2015/0090847 A1 Apr. 2, 2015

Related U.S. Application Data

(60) Provisional application No. 61/885,602, filed on Oct. 2, 2013.

(51) Int. Cl.
*B60D 1/00* (2006.01)
*B60D 1/28* (2006.01)
*B60D 1/06* (2006.01)
*B60D 1/48* (2006.01)

(52) U.S. Cl.
CPC ............. *B60D 1/28* (2013.01); *B60D 1/06* (2013.01); *B60D 1/488* (2013.01)

(58) Field of Classification Search
CPC ............. B60D 1/485; B60D 1/52; B60D 1/28
See application file for complete search history.

(56) References Cited

U.S. PATENT DOCUMENTS

| | | | | |
|---|---|---|---|---|
| 5,529,329 A * | 6/1996 | McCoy | ............. | B62D 53/0835 280/437 |
| 5,707,070 A * | 1/1998 | Lindenman | ........ | B62D 53/0828 280/407 |
| 5,971,418 A * | 10/1999 | Lindenman | ............. | B60D 1/06 280/417.1 |
| 6,467,791 B1 * | 10/2002 | Fandrich | .................. | B60D 1/00 280/491.5 |
| 7,121,573 B2 * | 10/2006 | Lindenman | ............ | B62D 53/08 280/433 |
| 7,793,968 B1 * | 9/2010 | Withers | .................. | B60D 1/015 280/415.1 |
| 8,215,658 B2 * | 7/2012 | Stanifer | .................... | B60D 1/28 280/433 |
| 8,360,458 B2 * | 1/2013 | Stanifer | .................... | B60D 1/28 280/433 |

(Continued)

*Primary Examiner* — Bradley Duckworth
(74) *Attorney, Agent, or Firm* — McDonald Hopkins LLC

(57) ABSTRACT

A tie down apparatus for securing an item is shown and described herein. The tie down apparatus may include first and second body members, where the first body member is configured to be located and rotated about a first axis within a first receiving member and the second body member is configured to be located and rotated about a second axis within a second receiving member. The tie down apparatus may also include first and second locking members each extending through the first and second body members, respectively, where rotating the first and second body members about the respective first and second axes engages the first and second locking members and generally prevents removal of the first and second body members from the first and second receiving member, and a safety chain holding member selectively engaged with either of the first and second body members.

23 Claims, 12 Drawing Sheets

(56) References Cited

U.S. PATENT DOCUMENTS

| | | | | |
|---|---|---|---|---|
| 8,414,009 B2* | 4/2013 | Stanifer | ................... | B60D 1/02 |
| | | | | 280/433 |
| 8,925,952 B2* | 1/2015 | Leech | ................... | B62D 53/08 |
| | | | | 280/415.1 |
| 9,067,468 B2* | 6/2015 | Stanifer | ................... | B60D 1/02 |
| 2013/0113181 A1* | 5/2013 | Stanifer | ............... | B60D 1/187 |
| | | | | 280/432 |
| 2013/0307248 A1* | 11/2013 | McCoy | ................... | B60D 1/06 |
| | | | | 280/495 |

* cited by examiner

SAFETY CHAIN TIE DOWN APPARATUS

CROSS-REFERENCE TO RELATED APPLICATION

This application claims the benefit of U.S. Provisional Patent Application Ser. No. 61/885,602 filed Oct. 2, 2013, and entitled "Safety Chain Tie Down Apparatus" which is incorporated herein by reference.

FIELD OF INVENTION

The present invention generally relates to hitches used for coupling a trailer to a towing vehicle and more particularly to a removable safety chain tie down apparatus for securing the safety chains of a trailer being towed.

BACKGROUND

There are many different types of hitches utilized to connect a towing vehicle with a towed vehicle, such as a trailer. These hitches attach the towed vehicle with the towing vehicle in a variety of ways, depending on the type of hitch, towed vehicle, or towing vehicle. Some of the most common types of hitches include gooseneck, fifth wheel, rear mount, and the like. Towed vehicles are often connected to a towing vehicle by way of a ball hitch secured to the towing vehicle and a ball socket coupling mechanism on the towed vehicle mounted over the ball. This configuration allows the towed vehicle to pivot behind the towing vehicle.

The ball hitch of some hitches, such as a gooseneck, for example, is commonly mounted in the load bed of the towing vehicle near the longitudinal centerline of the load bed. This may help distribute the weight of the towed vehicle generally evenly between the tires on sides of the towing vehicle. Gooseneck hitches are often attached to the frame of the towing vehicle under the load bed or attached on the load bed of the towing vehicle. In those gooseneck hitches attached to the frame of the towing vehicles, at least one hole is usually cut in the load bed of the towing vehicle for insertion of the hitch ball.

The hitch balls in gooseneck hitches are typically removable or retractable so that when the gooseneck hitch is not in use, the hitch ball may be removed or retracted. This may generally prevent obstruction of use of the load bed when the gooseneck hitch is not in use. With primary emphasis placed on storing/removing the hitch assemblies and hitch balls to avoid obstructions within the load bed of the towing vehicle, convenient placement of maintenance fittings have generally been overlooked.

Safety chains are often utilized with gooseneck hitches to provide a secondary means of connection between the rear of the towing vehicle and the front of the towed vehicle. In order to secure the safety chain, the towing vehicle utilizes some sort of safety chain attachment device. These safety chain attachment devices, however, often obstruct the load bed of the towing vehicle when the hitch is not being used. One solution is to drill additional holes in a load bed of the towing vehicle, and secure a safety chain attachment device to part of the gooseneck hitch attached below the load bed. However, drilling additional holes in the load bed is not always desirable.

Further, removable safety chain attachment devices utilize a single attachment point with the towing vehicle. This single point attachment, however, may limit the amount of force that may be applied to the safety chain attachment device. This may further limit the amount the gooseneck hitch may be able to effectively operate.

A need, therefore, exists for a safety chain attachment device that is removable from the load bed of the towing vehicle when not in use, is easy to operate, and does not require new additional holes to be made in the load bed of the towing vehicle. Further, there is a need for a safety chain attachment device that is able to utilize more than one point of contact and is able to handle larger loads.

SUMMARY

A tie down apparatus for securing an item, the tie down apparatus may include first and second body members, where the first body member is configured to be located and rotated about a first axis within a first receiving member and the second body member is configured to be located and rotated about a second axis within a second receiving member. First and second locking members may extend through the first and second body members, respectively, wherein rotating the first and second body members about the respective first and second axes engages the first and second locking members and generally prevents removal of the first and second body members from the first and second receiving member. A safety chain holding member may be selectively engaged with either of the first and second body members.

The tie down apparatus may further include first and second handles attached with the first and second body members, respectively. The first handle may be configured to rotate the first body member about the first axis. The second handle may be configured to rotate the second body member about the second axis. The safety chain holding member may include a safety chain engaging portion and a safety chain locking portion. The safety chain locking portion may be configured to generally prevent removal of a hook from the safety chain holding member. The safety chain holding member may be configured to operatively handle a load of at least 30,000 pounds. The first body member and second body member may be a substantially similar configuration. The first and second receiving members may be a substantially a similar configuration. The safety chain holding member may be selectively engaged with both of the first and second body members.

A tie down apparatus for securing an item of the present disclosure may include a body member contoured to secure a safety chain. A first mounting member may extend from the body member, wherein the first mounting member may be configured to be received by a first receiving member whereby rotating the first mounting member about a first axis selectively engages the first mounting member with the first receiving member. A second mounting member may extend through the body member, wherein the second mounting member may be configured to be received by a second receiving member whereby rotating the second mounting member about a second axis selectively engages the second mounting member with the second receiving member. The first and second mounting members engaged to the first and second receiving members, respectively generally prevents axially movement of the body member.

The first mounting member may be fixed relative to the body. The first and second mounting members may include first and second locking members, respectively to selectively engage the respective first and second receiving members. A handle may extend from the second mounting member and may be configured to rotate the second mounting member relative to the body to operatively secure the second mounting member to the second receiving member. The handle may be configured to be operatively secured to the body when the second locking member is engaged to the second receiving member.

A tie down apparatus for securing an item, the tie down apparatus may include a body member contoured to secure a safety chain thereto. The body member may include first and second apertures. First and second mounting members may extend through the first and second apertures, respectively, wherein the first and second mounting members may be configured to be received by first and second receiving members, respectively. First and second handles may be operatively secured with the first and second mounting members, respectively, wherein rotation of the first and second handles about first and second axes, respectively, engages the first and second mounting members to the first and second receiving members. This configuration may generally prevent axially movement of the body member relative to the first and second receiving members.

The first and second mounting members may include first and second locking members, respectively to selectively engage the first and second receiving members. The first and second mounting members may include a first and a second handle, respectively. The first handle and the second handle may be operatively secured to the body member. The first handle and second handle may be operatively secured to one another as first and second mounting members are operatively engaged to the first and second receiving members. The body member may further include a channel that is configured to receive the first and second handles therein as the first and second mounting members are operatively engaged to the first and second receiving members. The body member may include a third aperture configured to operatively accept the safety chain. The third aperture may include a reinforced area whereby the safety chain is operatively engageable. The third aperture may be configured to accept a hook of the safety chain.

BRIEF DESCRIPTION OF THE DRAWINGS

Objects and advantages together with the operation of the invention may be better understood by reference to the detailed description taken in connection with the following illustrations, wherein:

FIG. 3 is a perspective view of embodiments of a removable safety chain tie down apparatus.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the invention.

Figure 1:
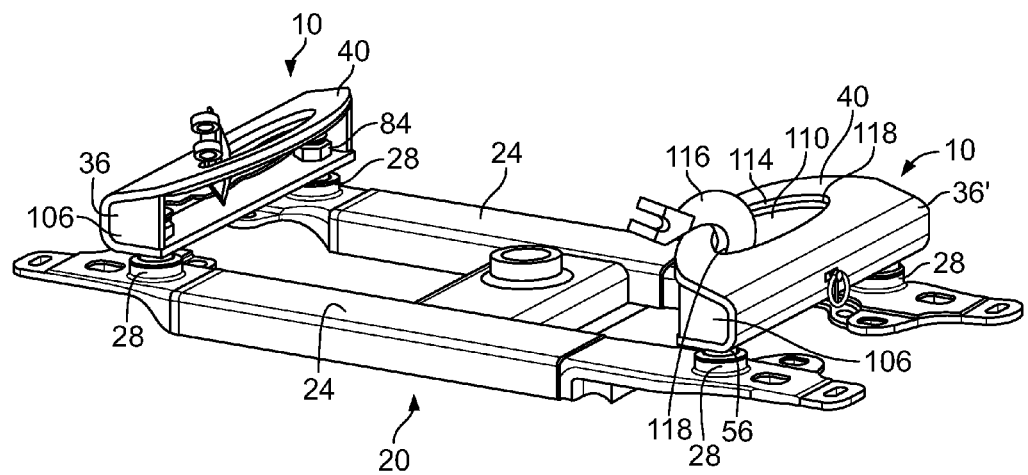
FIG. 1 is a perspective view of a removable safety chain tie down apparatus selectively attached with an under bed hitch mounting system.
Figure 2:
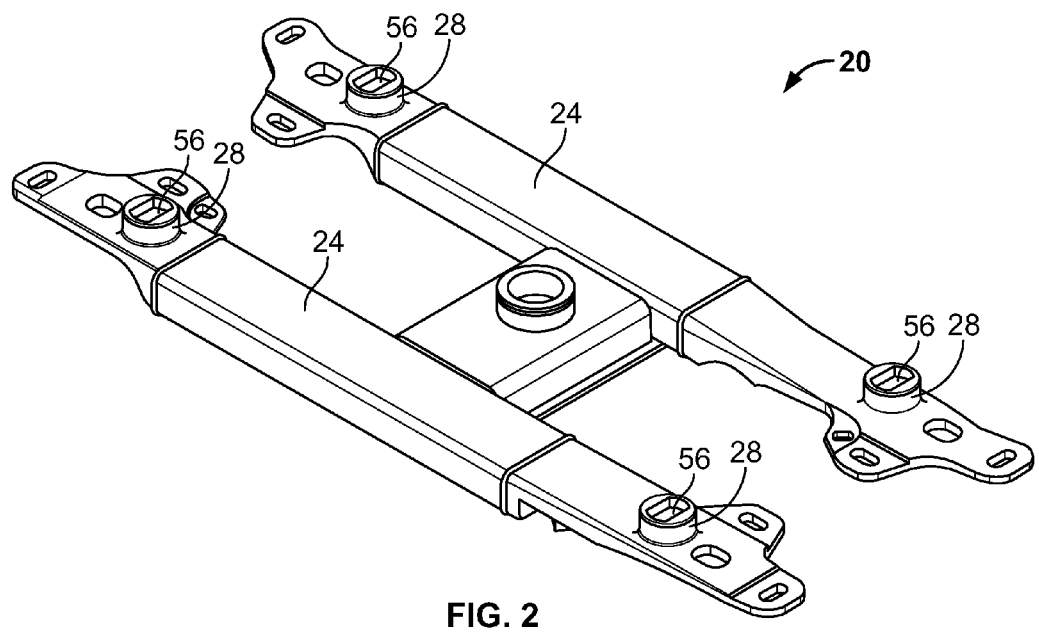
FIG. 2 is a perspective view of an exemplary under bed hitch mounting system.
Figure 3:
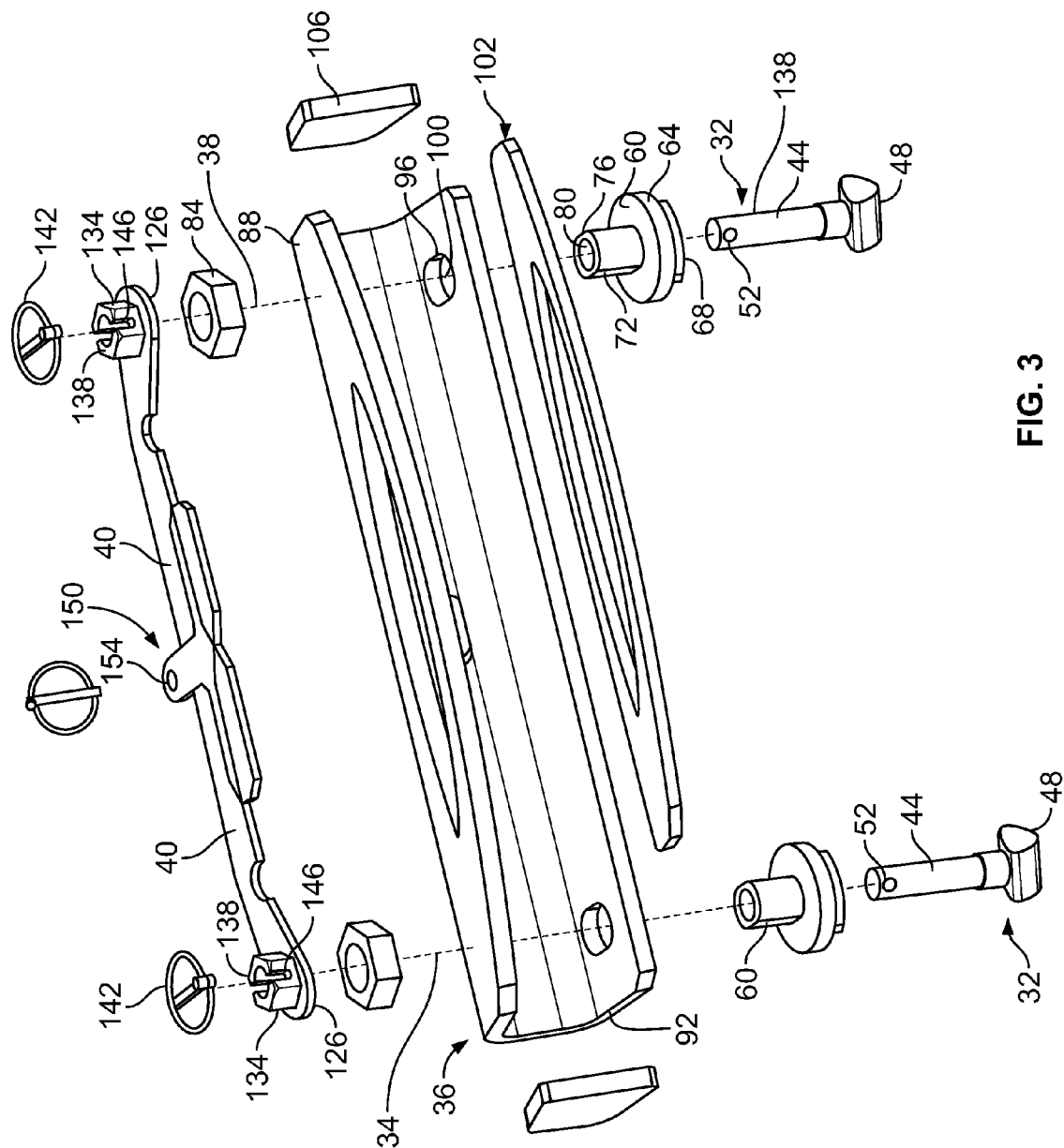
FIG. 3 is an exploded view of the removable safety chain tie down apparatus.
Figure 4:
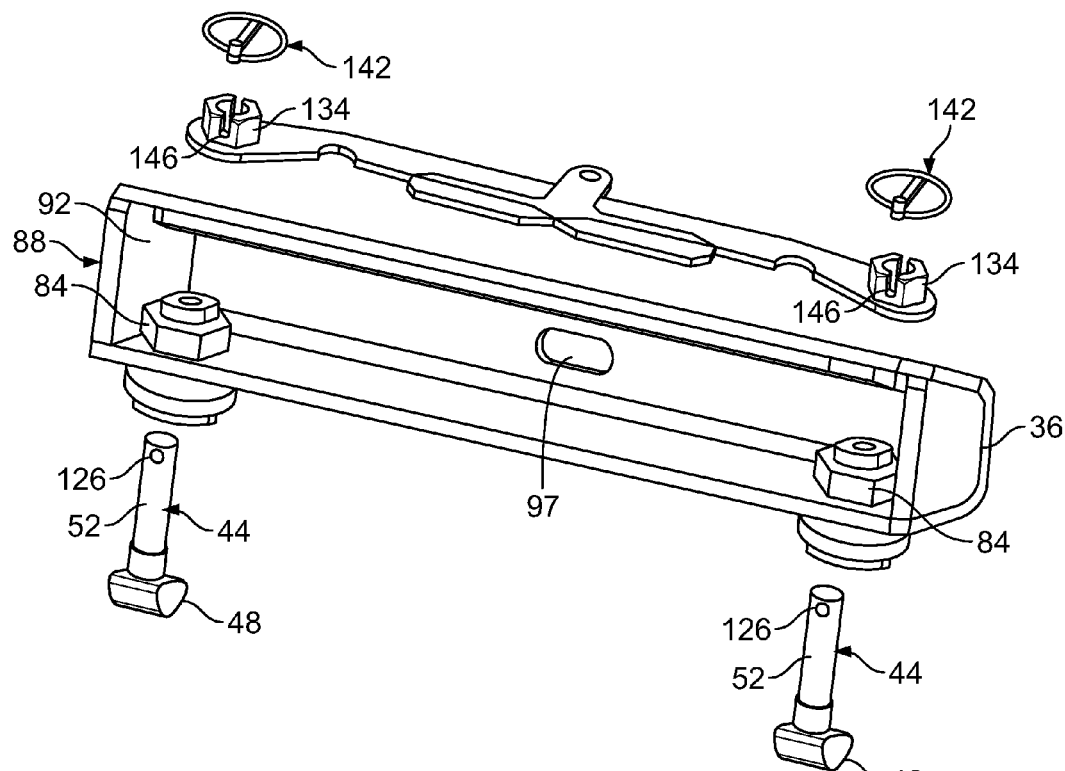
FIG. 4 is an exploded view of a portion of the removable safety chain tie down apparatus.
Figure 5:
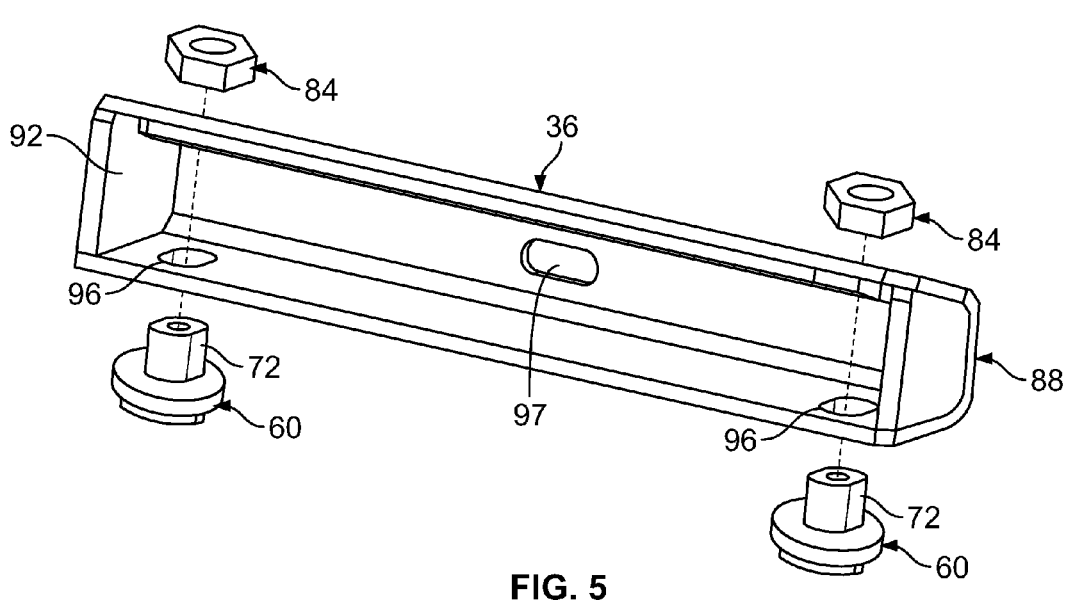
FIG. 5 is an exploded view of a portion of the removable safety chain tie down apparatus.
Figure 6:
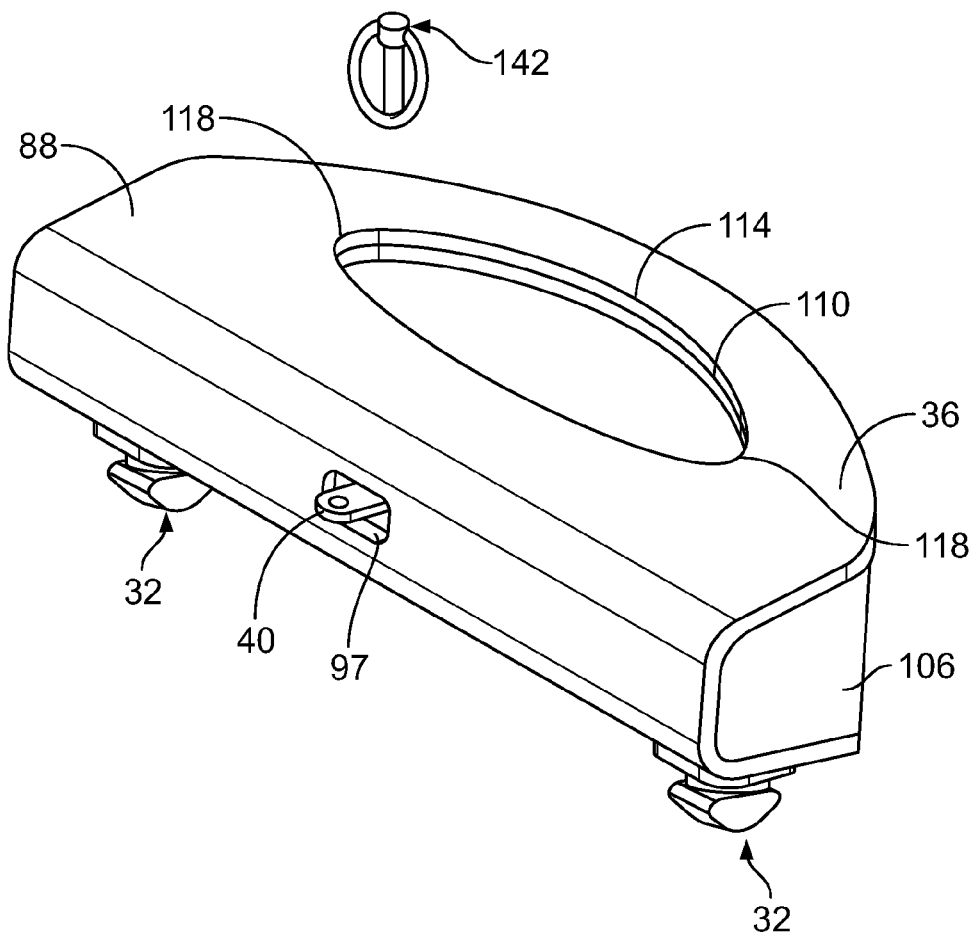
FIG. 6 is a side perspective view of the removable safety chain tie down apparatus.
Figure 7:
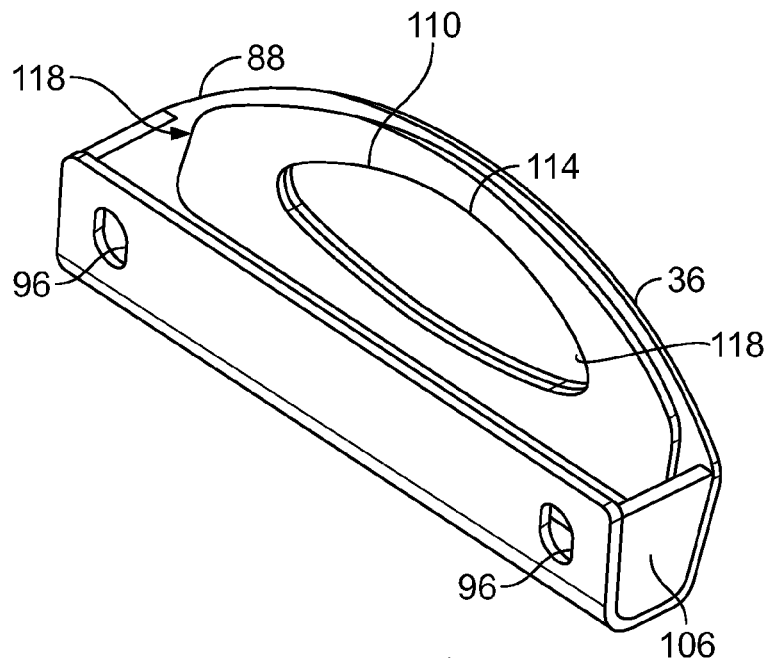
FIG. 7 is a side perspective view of a safety chain body of a removable safety chain tie down apparatus.
Figure 8:
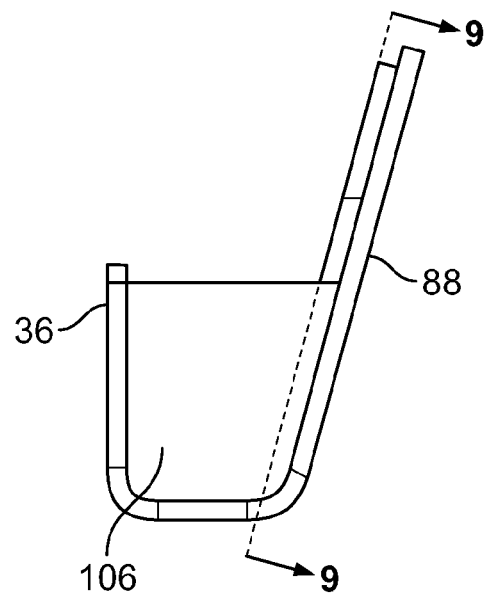
FIG. 8 is a side view of a safety chain body of a removable safety chain tie down apparatus.
Figure 9:
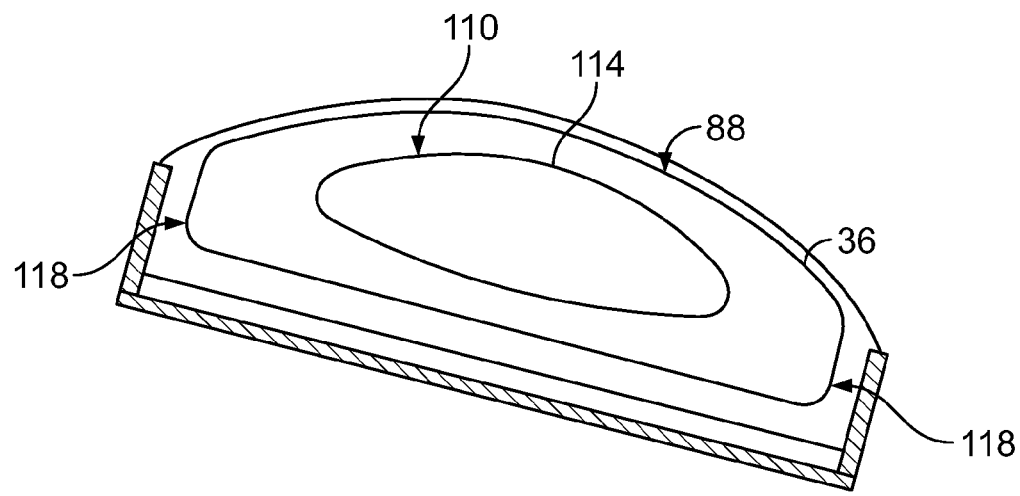
FIG. 9 is a cross-sectional view of the safety chain body of a removable safety chain tie down apparatus of FIG. 8 along line B-B.

A removable safety chain tie down apparatus or assembly 10 is illustrated in FIGS. 1 and 3. The removable safety chain tie down apparatus 10 may be configured to selectively attached with an under bed hitch mounting system 20, such as that shown and described in U.S. Pat. Nos. 7,121,573 and 8,414,009 and U.S. application Ser. No. 13/992,331 now U.S. Published Patent application number US 2013/0307248A1 all of which are hereby incorporated by reference—see also FIG. 2. By way of a non-limiting example, the under bed hitch mounting system 20 may be attached to a frame of a towing vehicle in any appropriate manner, such as disclosed in the aforementioned patents and published patent application.

The under bed hitch mounting system 20 may include at least one rail 24 and at least one receiving member 28 attached to the at least one rail 24. By way of a non-limiting example, the under bed hitch mounting system 20 may include a pair of transverse rails 24 with each rail 24 having a receiving member 28 attached to each end thereof. The under bed hitch mounting system 20 may therefore include four receiving members 28. The receiving members 28 may be of any appropriate configuration, including, without limitation as disclosed in U.S. Pat. Nos. 7,121,573 and 8,414,009 and U.S. application Ser. No. 13/992,331 now U.S. Published Patent application number US 2013/0307248A1.

The under bed hitch mounting system 20 and in particular the receiving members 28 may be accessible from a load bed of the towing vehicle. Holes may be formed in the load bed that may correspond with each of the receiving members 28 such that they are accessible from the load bed. Further, each of the receiving members 28 may include a locking cavity 56 of any appropriate configuration. It should be understood, however, that any appropriate configuration of an under bed hitch mounting system may be utilized without departing from the present teachings.

The removable safety chain tie down apparatus 10 may include at least one mounting member 32, a safety chain body member 36 and at least one control handle 40. As shown in FIGS. 1 and 3, the removable safety chain tie down apparatus 10 may include a corresponding number of mounting members 32, such as by way of a non-limiting four, as receiving members 28 of the under bed hitch mounting system 20. It should be understood, however, that any appropriate number of mounting members 32 may be utilized without departing from the present teachings.

As shown, the removable safety chain tie down apparatus 10 may include a pair of mounting members 32 that may be selectively engaged with a corresponding pair of receiving members 28. A first body member 36 may include a mounting member 32 that may be aligned along a first axis 34 and an opposing mounting member 32 may be aligned along a second axis 38. When selectively engaged, a first receiving member 28 is aligned along the first axis 34 and a second receiving member 28 is aligned along the second axis 38. As illustrated by FIG. 1, a second body member 36' may be spaced from the first body member 36. This may also result in each of the body members 36, 36' of the removable safety chain tie down apparatus 10 having a pair of control handles 40 as the first and second control handles 40 may be operatively attached with each of the mounting members 32 as described in more detail below. This may result in the removable safety chain tie down apparatus 10 having two points of attachment with the under bed hitch mounting system 20 as opposed to a single point of attachment for most other prior art systems. The two point of attachments for the removable safety chain tie down apparatus 10 may allow it to withstand greater loads than other prior art systems. By way of a non-limiting example, the removable safety chain tie down apparatus 10 utilizing the two points of attachment may be able to operatively handle loads at least 31,500 or even 35,000 pounds. Such loads may include a 35,000 pound chain pull. This may result in the removable safety chain tie down apparatus 10 being a heavy duty system configured for large load applications.

The mounting member 32 may include an elongated body 44 having at least one locking lug 48 adjacent an end thereof and an accessory mounting shank 52 distal the locking lug 48. As shown, the mounting member 32 may include two opposed locking lugs 48. The mounting member 32 may include at least one bushing 60 configured to have inserted therein a portion of the elongated body 44.

The bushing 60 may include an annular ring portion 64 and a key locator 68 extending therefrom and adjacent thereto. The key locator 68 may be of a mating or corresponding configuration to that of the receiving member 28. The bushing 60 may further include a generally cylindrical body portion 72 that maybe of any appropriate configuration. As shown, the cylindrical body 72 may include two generally flat portions 76 as will be described in more detail below. The bushing 60 may further include an aperture 80 extending therethrough. The aperture 80 may be of a configuration to accept the elongated body 44 such that the elongated body 44 may extend therethrough.

The mounting member 32 may further include a jam nut 84. The jam nut 84 may be configured to engage the cylindrical portion 72 of the bushing 60. As shown, the cylindrical portion 72 may be inserted through the jam nut 84 such that the jam nut 84 may circumscribe the cylindrical portion 72 of the bushing.

The safety chain body 36 may be of any appropriate configuration. As shown in FIG. 3, the safety chain body 36 may include a generally C-shaped cross-sectional shape. It should be understood, however, that the safety chain body 36 may include an appropriate shape and is not limited to that shown and described herein. The safety chain body 36 may formed from a monolithic member or may be formed through attachment of components. In those embodiments in which the safety chain body 36 is formed from components or monolithically formed therewith, the safety chain body 36 may include a generally C-shaped member 88. The C-shaped member 88 may be formed from a single plate member formed into such C-shape through any appropriate process.

The C-shaped member 88 may include channel 92 formed therein. The channel 92 may be of any appropriate shape and as shown may extend generally an entire length of the C-shaped member 88. The C-shaped member 88 may further include a pair of apertures 96 positioned within the channel 92 and a second aperture 97. The apertures 96 may be configured to engage at least a portion of the mounting member 32. By way of a non-limiting example, the cylindrical portion 72 of the bushing 60 may be inserted into and through each of the apertures 96. The apertures 96 may include a pair of flat sides 100 that may correspond with the flat portions 76 of the cylindrical portion 72. The flat portions 76 may engage with the flat sides 100 so as to generally prevent rotation of the bushing 60 when inserted into and through the apertures 96. Further, as shown once the bushing 60 is inserted into a through the aperture 96, the jam nut 84 may operatively engage the bushing 60 as described above, e.g., snap fit, threaded together or otherwise engaged therewith. In such embodiments, the C-shaped member 88 may be positioned between the jam nut 84 and the bushing 60.

The safety chain body 36 may further include a reinforcement member 102 that may be attached with the C-shaped member 88 in any appropriate manner. By way of a non-limiting example, the reinforcement member 102 may be welded to a portion of the C-shaped member 88, fastened or monolithically formed therewith. The reinforcement member 102 may provide additional stiffness to the removable safety chain tie down apparatus 10 during operation thereof. This may permit the removable safety chain tie down apparatus 10 to operatively withstand greater forces than other prior art systems.

The safety chain body 36 may further include a pair of gussets 106. The gussets 106 may be attached with the C-shaped member 88 at opposed sides thereof. By way of a non-limiting example, the gussets 106 may be welded to, fastened with or monolithically formed with opposed sides of the C-shaped member 88 at ends of the channel 92. The gussets 106 may provide additional support to the safety chain body 36 during operation thereof so that it may withstand greater forces than prior art systems.

The safety chain body 36 may further include a safety chain aperture 110 of any appropriate configuration. The safety chain aperture 110 may be configured such that a portion of the safety chain (not shown) may engage the safety chain aperture 110 to retain the safety chain in its operative position. By way of a non-limiting example, the safety chain aperture 110 may be configured within the safety chain body 36 so that there is a safety chain engaging portion 114 and a safety chain locking portion 118. The safety chain engaging portion 114 permits the user to engage the safety chain with the removable safety chain tie down apparatus 10. The safety chain locking portion 118 generally prevents the safety chain from being removed or otherwise becoming disengaged with the removable safety chain tie down apparatus 10. In these embodiments, the removable safety chain tie down apparatus 10 may have two points of contact with the under bed hitch mounting system 20 and a single point of engagement with a safety chain, i.e., the safety chain engaging portion 114.

In some embodiments, the safety chain engaging portion 114 may include a portion of the safety chain body 36 that is adjacent to and extending laterally from the safety chain aperture 110. The safety chain engaging portion 114 may be of a dimension such that a hook 116 of a safety chain may be selectively engaged to and disengaged from the safety chain engaging portion 114. By way of a non-limiting example, the safety chain engaging portion 114 may be approximately one inch. However, the present teachings are not limited to this dimension.

The safety chain locking portion 118 may include a portion of the safety chain body 36 that is adjacent to and extending transversely from the safety chain aperture 110. The safety chain locking portion 118 may be generally perpendicular the safety chain engaging portion 114. Still further, the removable safety chain tie down apparatus 10 may include two safety chain locking portions 118, which may be positioned distal one another. The safety chain locking portion 118 may be of a dimension such that the hook of a safety chain may be prevented from being able to be removed from the safety chain locking portion 118 when engaged therewith. By way of a non-limiting example, the safety chain locking portion 118 may be approximately three to four inches.

In operation, a user may attach the hook of the safety with the safety chain engaging portion 114. During use of the removable safety chain tie down apparatus 10, the hook and in turn a portion of the safety chain may be pulled toward either of the safety chain locking portion 118 such that the hook may become engaged therewith. When the hook is engaged with the safety chain locking portion 118, the hook may be generally prevented from being removed. In some embodiments, the hook may be of a corresponding size with the safety chain locking portion 118 such that the safety chain locking portion 118 substantially fills the space of the hook preventing it from become open and disengaged. Further, in those embodiments in which a pair of safety chain locking portions 118 is utilized, a pair of hooks may be utilized such that each hook engages with each of the safety chain locking portions 118 such that the safety chain locking portions 118 generally prevent removal of the hooks.

As noted above, the control handle 40 may be operatively engaged with the mounting member 32 to engage and disengage the mounting member 32 with the under bed hitch mounting system 20 to engage and disengage the removable safety chain tie down apparatus 10 with the under bed hitch mounting system 20. In some embodiments, the control handle 40 may include an aperture 126 extending therethrough. The aperture 126 may be positioned at an end portion 130 of the control handle 40. A reinforcing member 134 may be attached with the control handle 40 and may generally circumscribe the aperture 126. The aperture 126 and reinforcing member 134 may be configured to allow a portion of the accessory mounting shank 52 to extend therethrough.

In some embodiments, the accessory mounting shank 52 may include an aperture 138 at an end portion thereof. The accessory mounting shank 52 may be inserted through the aperture 126 and reinforcing member 134. A lynch pin 142 may be operatively inserted through the aperture 138 securing the mounting member 32 with the control handle 40. Further, the reinforcing member 134 may include a clearance portion 146, such as a slot as shown, whereby the lynch pin 142 may engage upon insertion through the aperture 138. The slot 146 may be of a configuration such that the lynch pin 142 may engage it and prevent the lynch pin 142 from extending above the reinforcing member 134. This may generally prevent the lynch pin 142 from becoming inadvertently removed from the aperture 138. Additionally, this may prevent the mounting shank 52 from becoming inadvertently rotated relative to the reinforcing member 134 as it is positioned relative to the control handle 40.

The removable safety chain tie down apparatus 10 may be configured to be selectively attached and detached from the under bed hitch mounting system 20. As noted above, the removable safety chain tie down apparatus 10 may be selectively attached with the under bed hitch mounting system 20 at two points of connection, i.e., it may selectively attach with two of the receiving members 28 of the under bed hitch mounting system 10. In such embodiments, the removable safety chain tie down apparatus 10 may include the pair of mounting members 32. Each of the mounting members 32 may be aligned with a corresponding locking cavity 56 of the receiving member 28 in the load bed of the towing vehicle. Sufficient clearance may exist for the mounting member 32 to enter and seat in the locking cavity 56. Once fully seated, the mounting member 32 may be rotated approximately 90 degrees with respect to the receiving member 28 such that the locking lugs 48 may be generally aligned with the locking cavity 56 generally preventing removal from the locking cavity 56.

As shown in FIGS. 1 and 3, each of the pair of mounting members 32 may be secured to the safety chain body 36 securing the removable safety chain tie down apparatus 10 with the under bed hitch mounting system 20. More specifically, the accessory mounting shank 52 of the body 44 may be inserted through the aperture 80 of the bushing 60. This may be repeated for each of the mounting members 32. The cylindrical portion 72 of the bushing 60 may be inserted through the aperture 96 of the safety chain body 36. The flat portions 76 of the bushing 60 may mate with the flat sides 100 of the apertures 96, i.e., the aperture 96 may be acircular and may engage a cooperating acircular portion of the bushing 60. This may generally prevent the bushing 60 from rotating relative to the safety chain body 36. Further, the accessory mounting shank 52 may extend into the channel 92.

The jam nut 84 may be inserted into the channel 92 and engaged with the accessory mounting shank 52 positioned within the channel 92. In some embodiments, the jam nut 84 may threadably engage the accessory mounting shank 52 or the jam nut 84 may be friction fit with the accessory mounting shank 52. The control handle 40 may be inserted into the channel 92 such that a portion of the control handle 40 may extend through aperture 97. The control handle 40 may be operatively attached with the mounting member 32. More specifically, the accessory mounting shank 52 may be inserted into and through the aperture 126 of the control handle 40 and through the reinforcing member 134. The lynch pin 142 may be inserted into and engaged with the aperture 138 of the accessory mounting shank 52. The lynch pin 142 may rest within the slot 146 generally preventing removal therefrom. Again, this may be repeated for the other mounting member 32 and control handle 40.

When it is desired to attach the removable safety chain tie down apparatus 10 each of the pair of mounting members 32 may be aligned by operation of its respective control handle 40 so that locking lugs 48 of each of the mounting members 32 are generally aligned with the locking cavity 56. This provides the necessary clearance to allow each mounting member 32 to drop into and be fully seated in the locking cavity 56 of the associated receiving member 28. Once each mounting member 32 is fully seated, each of the control handles 40 may be rotated through an arc of approximately 90 degrees. Simultaneously, the mounting members 32 may be rotated so that the locking lugs 48 may now be aligned with and engage the receiving members 28.

This engagement between the lugs 48 and the receiving member 28 serves to secure the mounting member 32 and, therefore, the removable safety chain tie down apparatus 10 to the under bed hitch mounting system 20 and the towing vehicle. The control handles 40 may be secured in the locking position. In particular, ends 150 of the control handles 40 may extend into engagement with one another within the channel 92. The ends 150 may each include an aperture 154. A fastener, such as a pin, can be inserted through the aperture 154, which may secure the control handles 40 and the mounting members 32 in the locked position. To remove the removable safety chain tie down apparatus 10, the opposite may be completed and the mounting member 32 removed from the receiving member 28.

The removable safety chain tie down apparatus 10 being a two point engagement with the towing vehicle, or more specifically the under bed hitch mounting system 20 may operatively handle a larger loads of towed vehicles, e.g., a pull chain load of approximately 35,000 pounds. The removable safety chain tie down apparatus 10 may provide a practical and hidden safety chain tie down apparatus that may be associated with and attached to a trailer mounting system where the removable safety chain tie down apparatus 10 may be adapted to reliably and securely engage the hooks 116 of a safety chain. Unlike the prior art, the removable safety chain tie down apparatus 10 may utilize two points of attachment.

The removable safety chain tie down apparatus 10 may be constructed to securely and removably anchor down the safety chain that may be in use with a trailer hitch. The removable safety chain tie down apparatus 10 may be of any number, including, without limitation having two points attached with the towing vehicle and may be of any appropriate shape. The removable safety chain tie down apparatus 10 may have a streamlined design and appearance that may be aesthetically pleasing. The removable safety chain tie down apparatus 10 may be used with any appropriate trailer hitch mounting kit, such as for example, such as with the "Signature Series" produced and sold by Cequent.

Additional embodiments of a removable safety chain tie down apparatus according the present teachings are described below. In the descriptions, all of the details and components may not be fully described or shown. Rather, some of the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired removable safety chain tie down apparatus without departing from the spirit and scope of the present teachings.

Figure 10:
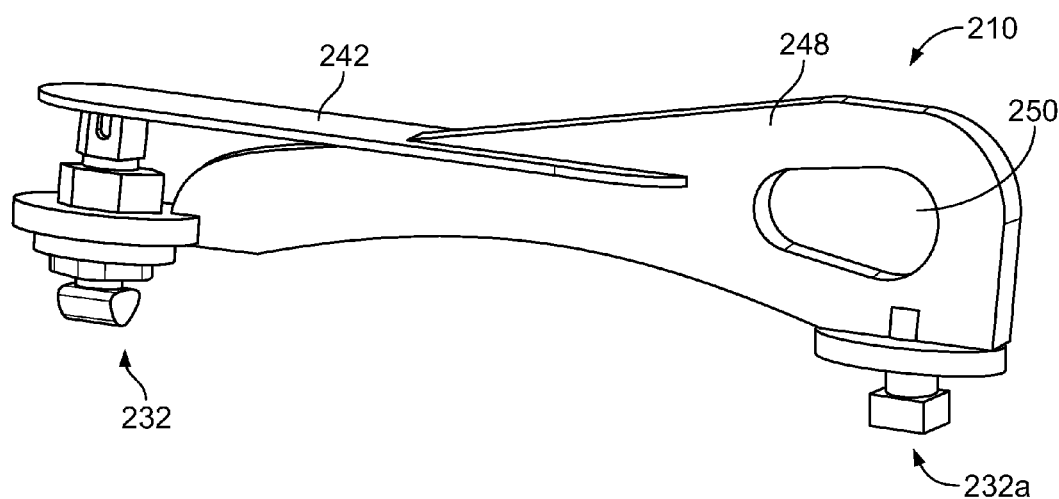
FIG. 10 is a perspective view of embodiments of a removable safety chain tie down apparatus.

A removable safety chain tie down apparatus 210, such as that shown in FIG. 10, may include a fixed mounting member 232a and a mounting member 232 similar to what is described above. In such embodiments, the fixed mounting member 232a may be secured with the receiving member 28. The other mounting member 232 may be selectively attached with the applicable receiving member 28 as described above. The fixed mounting member 232a and mounting member 232 may result in a two point attachment for the removable safety chain tie down apparatus 210, which may permit the removable safety chain tie down apparatus 210 to operatively handle larger loads than prior art systems.

The removable safety chain tie down apparatus 210 may include a handle 242 and a safety chain engaging body 248. The safety chain engaging body 248 may include an aperture 250 to which a safety chain or hook of a safety chain may operatively and selectively engage. The handle 242 may be configured to engage with the safety chain engaging body 248 when selectively positioned in the locking position shown in FIG. 10.

Figure 11:
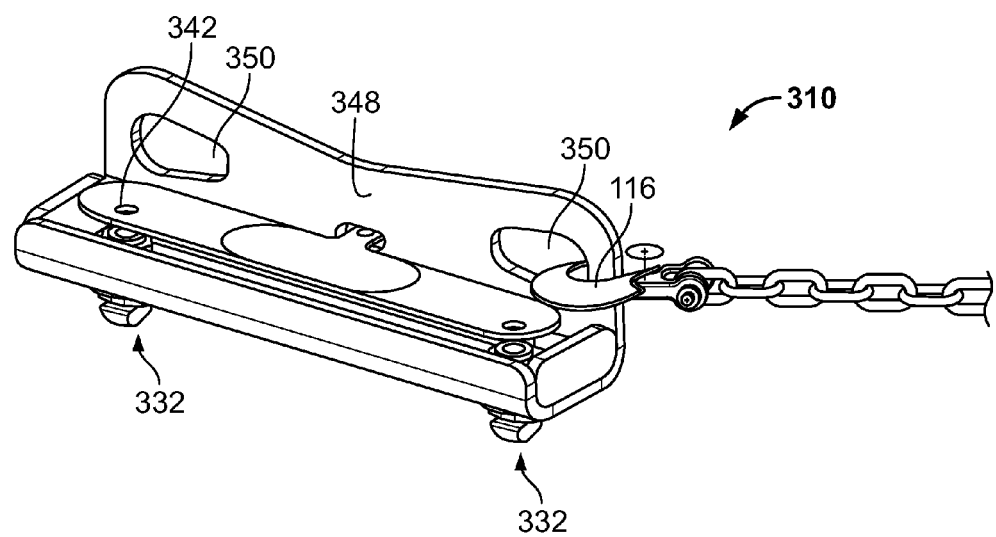
FIG. 11 is a perspective view of embodiments of a removable safety chain tie down apparatus.

A removable safety chain tie down apparatus 310, such as that shown in FIG. 11, may include a pair of mounting members 332 similar to what is described above. The removable safety chain tie down apparatus 310 may include a handle 342 and a safety chain engaging body 348. The safety chain engaging body 348 may include a pair of safety chain engaging members, such as the apertures 350. The apertures 350 may be of a configuration that a safety chain or hook 116 of a safety chain may operatively and selectively engage. The handle 342 may be configured to engage with the safety chain engaging body 348 when selectively positioned in the locking position shown in FIG. 11. The pair of mounting members 332 may result in a two point attachment for the removable safety chain tie down apparatus 310.

Figure 12:
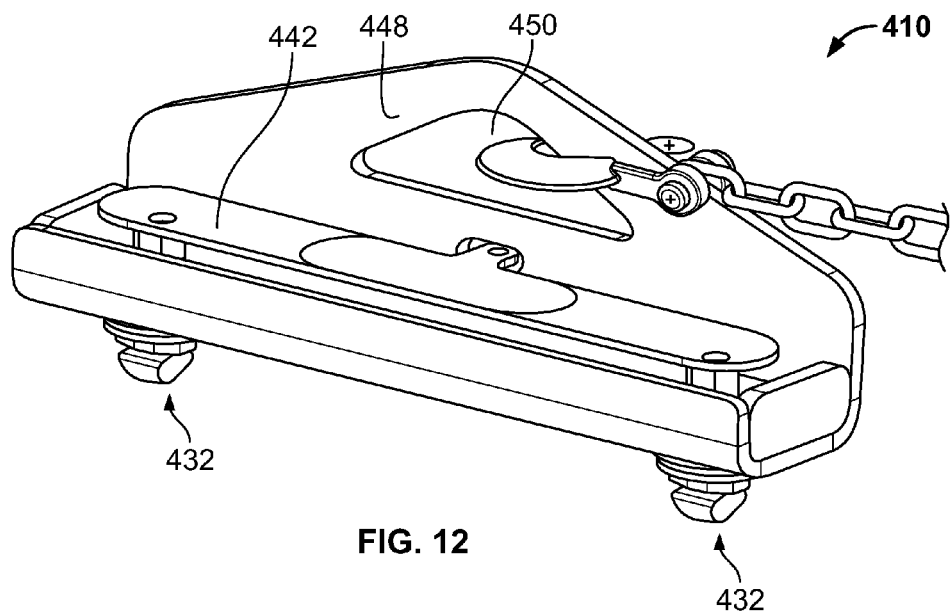
FIG. 12 is a perspective view of embodiments of a removable safety chain tie down apparatus.

A removable safety chain tie down apparatus 410, such as that shown in FIG. 12, may include a pair of mounting members 432 similar to what is described above. The removable safety chain tie down apparatus 410 may include a handle 442 and a safety chain engaging body 448. The safety chain engaging body 448 may include a safety chain engaging member, such as aperture 450. The aperture 450 may be of a configuration that a safety chain or hook of a safety chain may operatively and selectively engage. The handle 442 may be configured to engage with the safety chain engaging body 448 when selectively positioned in the locking position shown in FIG. 12. The pair of mounting members 432 may result in a two point attachment for the removable safety chain tie down apparatus 410.

Figure 13:
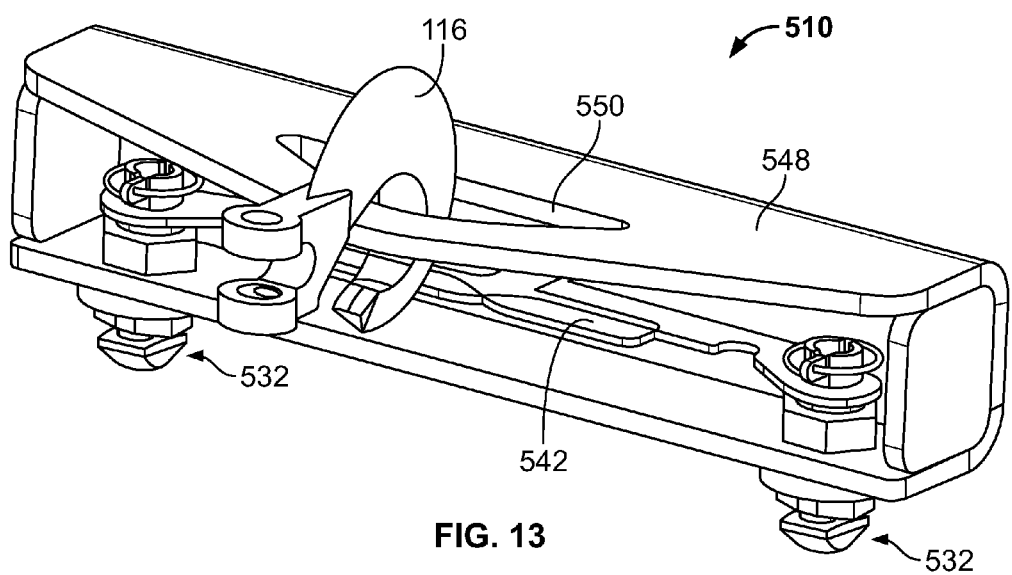
FIG. 13 is a perspective view of embodiments of a removable safety chain tie down apparatus.

A removable safety chain tie down apparatus 510, such as that shown in FIG. 13, may include a pair of mounting members 532 similar to what is described above. The removable safety chain tie down apparatus 510 may include a handle 542 and a safety chain engaging body 548. The safety chain engaging body 548 may include a safety chain engaging member, such as aperture 550. The aperture 550 may be of a configuration that a safety chain or hook of a safety chain may operatively and selectively engage. The handle 542 may be configured to engage with the safety chain engaging body 548 and may be positioned within a portion of the safety chain engaging body 548 as shown when selectively positioned in the locking position shown in FIG. 13. The pair of mounting members 532 may result in a two point attachment for the removable safety chain tie down apparatus 510, which may allow it to handle larger loads than other prior art systems.

Figure 14:
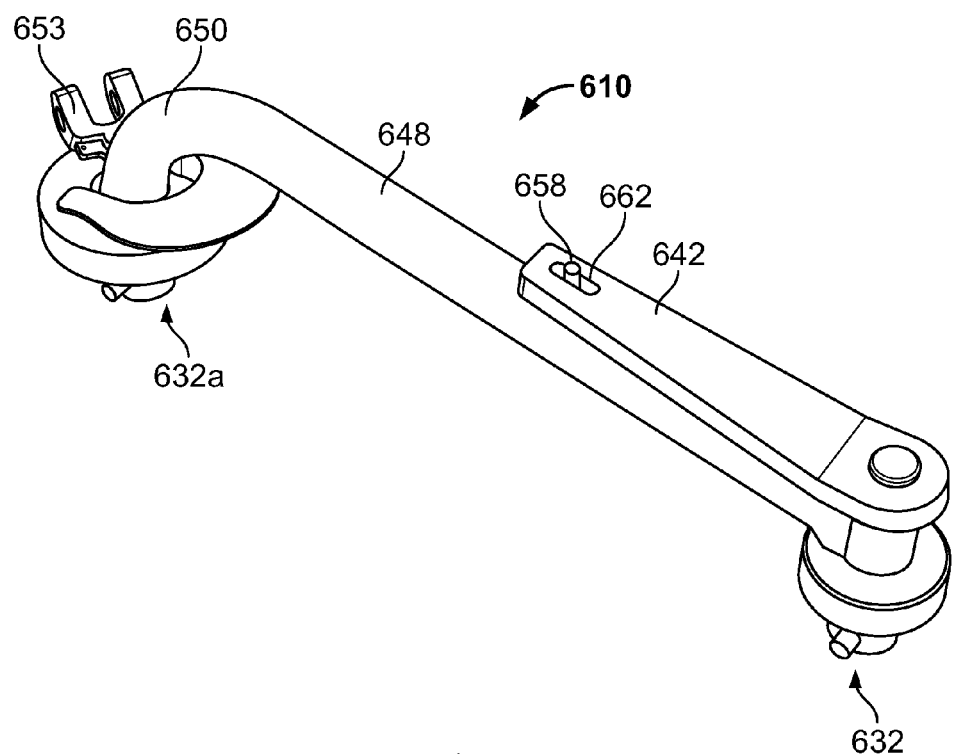
FIG. 14 is a perspective view of embodiments of a removable safety chain tie down apparatus.
Figure 15:
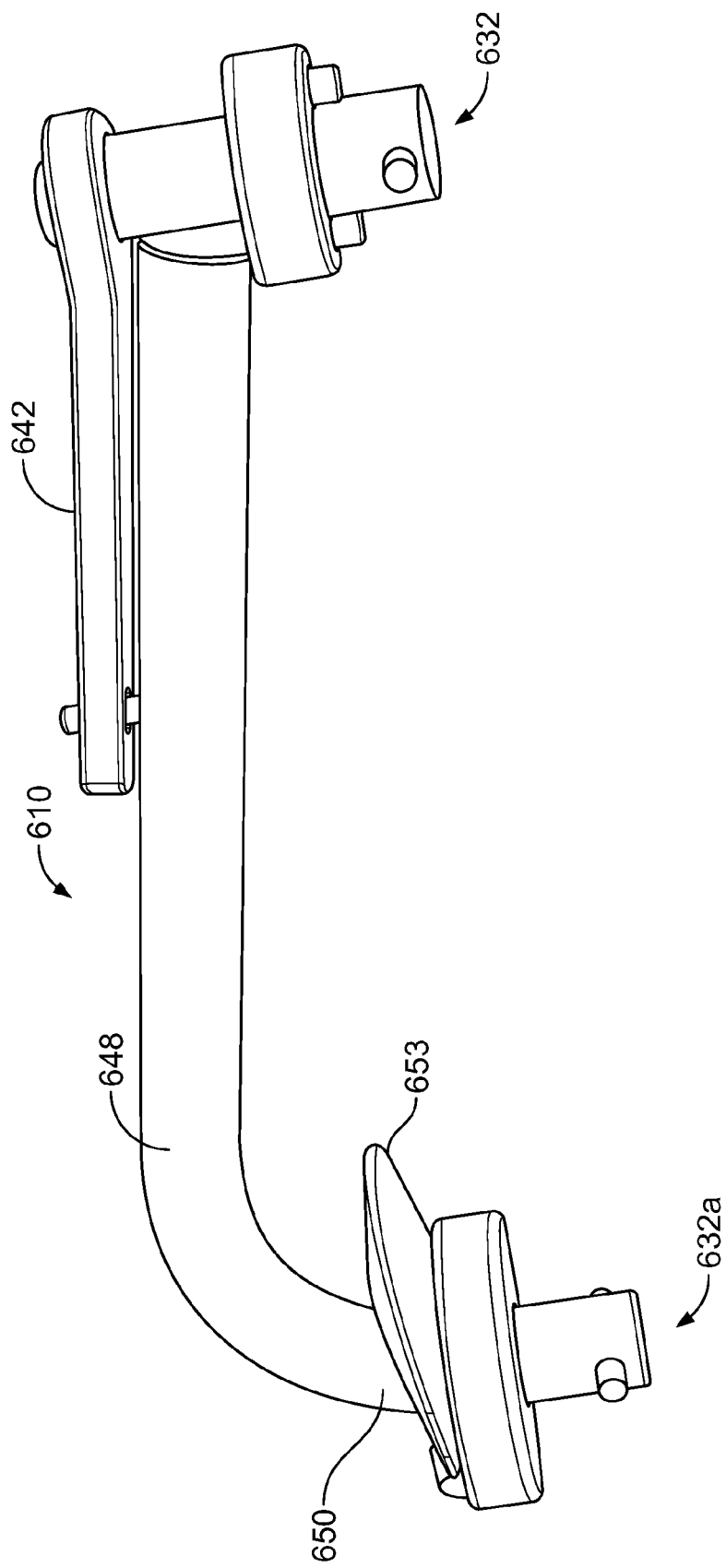
FIG. 15 is a side view of the embodiments of the removable safety chain tie down apparatus of FIG. 14.
Figure 16:
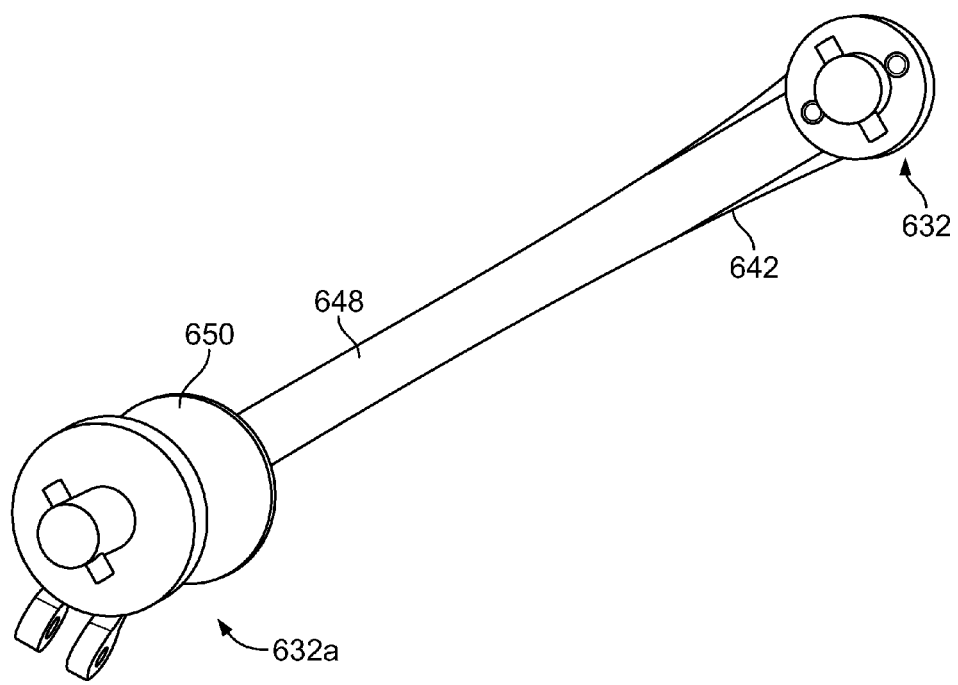
FIG. 16 is a bottom view of the embodiments of the removable safety chain tie down apparatus of FIG. 14.

A removable safety chain tie down apparatus 610, such as that shown in FIGS. 14-16, may include a fixed mounting member 632a and a mounting member 632 similar to what is described above. In such embodiments, the fixed mounting member 632a may be secured with the receiving member 28. The other mounting member 632 may be selectively attached with the applicable receiving member 28 as described above. The fixed mounting member 632a and mounting member 632 may result in a two point attachment for the removable safety chain tie down apparatus 610, which may allow it to handle larger loads than other prior art systems.

The removable safety chain tie down apparatus 610 may include a handle 642 and a safety chain engaging body 648. The safety chain engaging body 648 may include a portion 650 to which a safety chain or hook 653 of a safety chain may operatively and selectively engage. The handle 642 may be configured to engage with the safety chain engaging body 648 when selectively positioned in the locking position shown in FIGS. 14-16. In operation, the fixed mounting member 632a of the removable safety chain tie down apparatus 610 may be inserted into a rear receiving member 28. The safety chain engaging body 648 may be rotated an appropriate amount, such as by way of a non-limiting example it may be rotated rearward 90 degrees—it may also be rotated any amount in any appropriate direction without departing from the present teachings. The forward attachment or the other mounting member 632 may be lowered into a forward receiving member 28 such that the other mounting member 632 operatively engages the applicable receiving member 28. Once operatively engaged, the handle 642 may be rotated and the other mounting member 632 may selectively engage the applicable receiving member 28. By way of a non-limiting example, the handle 642 may be rotated approximately 90 degrees to selectively engage the other mounting member 632 with the receiving member 28. The handle 642 may be generally aligned with the body 648 as the removable safety chain tie down apparatus 610 is engaged with the receiving members 28. In some embodiments the handle 642 may be selectively attached to the body 648 for example with a projection 658 that extends from the body 648 through an aperture 662 in the handle 642. However, any known manner of selective attachment between the handle 642 and body 648 is contemplated by the disclosure.

Figure 17:
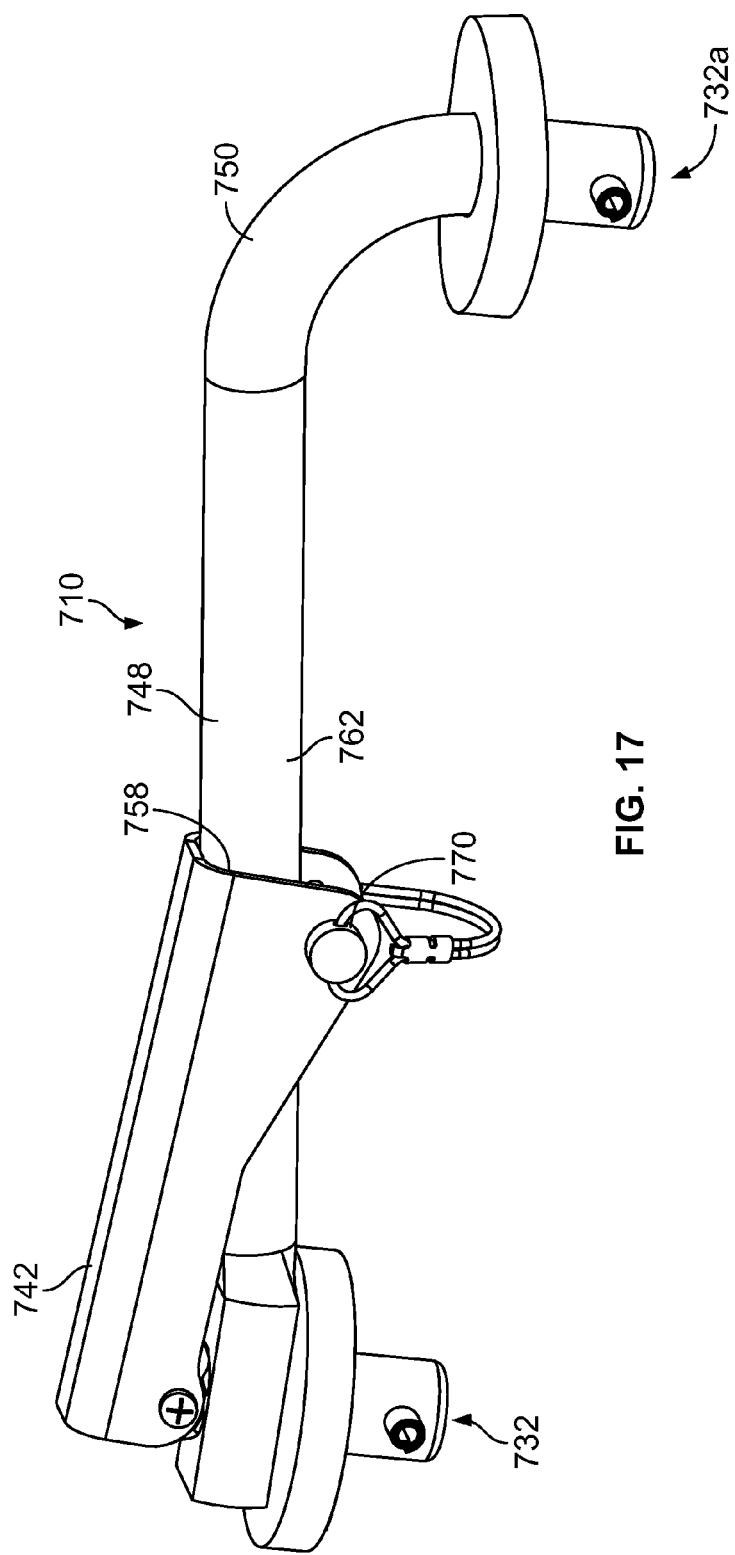
FIG. 17 is a perspective view of embodiments of a removable safety chain tie down apparatus.
Figure 18:
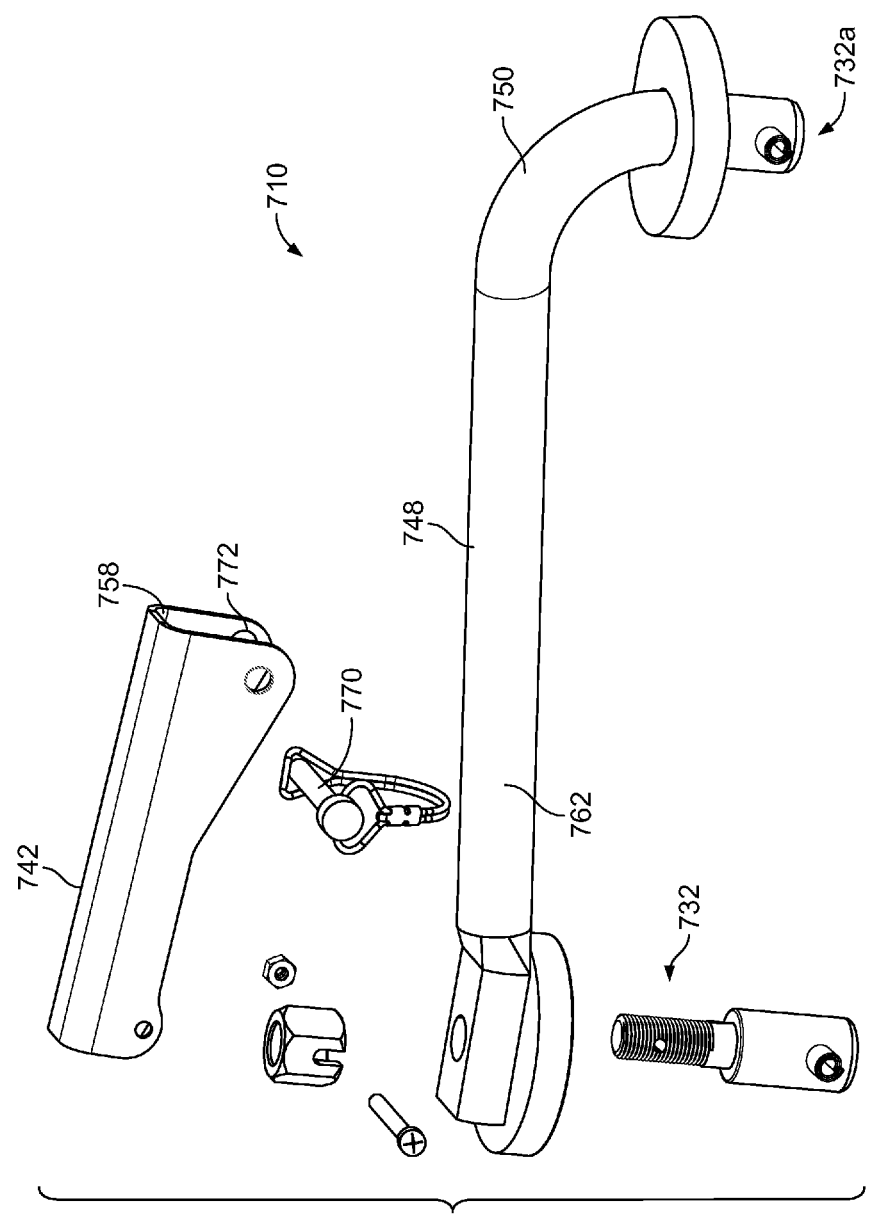
FIG. 18 is an exploded view of the embodiment of the removable safety chain tie down apparatus of FIG. 17.

FIGS. 17 and 18 illustrate other embodiments of a removable safety chain tie down apparatus 710, which may include a handle 742 and a safety chain engaging body 748. The safety chain engaging body 748 may include a portion 750 to which a safety chain or hook of a safety chain may operatively and selectively engage. The handle 742 may be configured to engage with the safety chain engaging body 748 when selectively positioned in the locking position shown in FIG. 18. In operation, the fixed mounting member 732a of the removable safety chain tie down apparatus 710 may be inserted into a rear receiving member 28. The safety chain engaging body 748 may be rotated an appropriate amount, such as by way of a non-limiting example it may be rotated 90 degrees relative to the receiving member 28. The opposing mounting member 732 may be lowered into an opposing receiving member 28 such that the mounting member 732 operatively engages the applicable receiving member 28. Once operatively engaged, the handle 742 may be rotated and the mounting member 732 may selectively engage the applicable receiving member 28 to become secured therein. By way of a non-limiting example, the handle 742 may be rotated approximately 90 degrees to selectively engage the mounting member 732 with the receiving member 28. The handle 742 may be generally aligned with the body 748 as the apparatus 710 is engaged to the receiving members 28. In some embodiments the handle 742 may be selectively attached to the body 748 for example the handle 742 may form a channel 758 that may at least partially conform to a surface 762 of the body 748 such that a locking pin 770 may extend through apertures 772 in the handle 742. However, any known manner of selective attachment between the handle 742 and body 748 is contemplated by the disclosure.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, I claim:

1. A tie down apparatus for securing an item, the tie down apparatus comprising:
    a first mounting member configured to be located and rotated about a first axis within a first receiving member;
    a second mounting member configured to be located and rotated about a second axis within a second receiving member;
    first and second locking members each attached to the first and second mounting members, respectively, wherein rotating the first and second mounting members about the respective first and second axes generally prevents removal of the first and second mounting members from the first and second receiving members, respectively;
    a safety chain engaging body member connected directly to and between the first and second mounting members, the safety chain engaging body member being contoured and including a portion to selectively engage with a safety chain or a hook, the safety chain engaging body member directly and selectively attached with a handle.

2. The tie down apparatus of claim 1, wherein the handle is attached with the second mounting member.

3. The tie down apparatus of claim 2, wherein the handle rotates the second mounting member about the second axis.

4. The tie down apparatus of claim 3, wherein the first mounting member is fixed relative to the safety chain engaging body member.

5. The tie down apparatus of claim 4, wherein the safety chain engaging body member is rotated approximately 90 degrees to selectively engage the first mounting member with the first receiving member.

6. The tie down apparatus of claim 5, wherein the handle is rotated approximately 90 degrees to selectively engage the second mounting member with the second receiving member.

7. The tie down apparatus of claim 1, wherein the safety chain engaging body member is configured to operatively handle a load of at least 30,000 pounds.

8. The tie down apparatus of claim 1, wherein the first locking member and second locking member are of substantially a similar configuration.

9. The tie down apparatus of claim 1, wherein the first and second receiving members are of substantially a similar configuration.

10. The tie down apparatus of claim 3, wherein the handle is generally aligned with the safety chain engaging body member when the first and second locking members are engaged to the receiving members.

11. A tie down apparatus for securing an item, the tie down apparatus comprising:
   a first mounting member;
   a second mounting member;
   a safety chain engaging body member directly connected to and between the first and second mounting members, wherein the first mounting member is configured to be received by a first receiving member whereby rotating the first mounting member about a first axis selectively engages the first mounting member with the first receiving member;
   wherein the second mounting member is configured to be received by a second receiving member whereby rotating the second mounting member about a second axis selectively engages the second mounting member with the second receiving member,
   wherein the first and second mounting members being engaged to the first and second receiving members, respectively generally prevents axial movement of the safety chain engaging body member; and
   a handle attached with the second mounting member, the handle directly and selectively attached with the body member.

12. The tie down apparatus of claim 11, wherein the first mounting member is fixed relative to the safety chain engaging body member.

13. The tie down apparatus of claim 11, wherein the first and second mounting members include first and second locking members, respectively to selectively engage the respective first and second receiving members.

14. The tie down apparatus of claim 11, wherein the handle rotates the second mounting member relative to the safety chain engaging body member to operatively secure the second mounting member to the second receiving member.

15. The tie down apparatus of claim 14, wherein the handle conforms to a surface of the safety chain engaging body member when the second locking member is engaged to the second receiving member.

16. A tie down apparatus for securing an item, the tie down apparatus comprising:
   a first mounting member;
   a second mounting member;
   a safety chain engaging body member, wherein the first and second mounting members extend from and are directly connected with the safety chain engaging body member, wherein the first and second mounting members are configured to be received by first and second receiving members, respectively; and
   a handle operatively secured with the second mounting member, wherein rotating the handle about a second axis selectively engages the second mounting member to the second receiving member generally preventing axial movement of the safety chain engaging body member relative to the second receiving member, the handle operatively secured to the safety chain engaging body member by a locking pin.

17. The tie down apparatus of claim 16, wherein the first and second mounting members include first and second locking members, respectively to selectively engage the first and second receiving members.

18. The tie down apparatus of claim 16, wherein the first mounting member is fixed relative to the safety chain engaging body member.

19. The tie down apparatus of claim 16, wherein the safety chain engaging body member is rotated approximately 90 degrees to selectively engage the first mounting member with the first receiving member.

20. The tie down apparatus of claim 19, wherein the handle is rotated approximately 90 degrees to selectively engage the second mounting member with the second receiving member.

21. The tie down apparatus of claim 16, wherein the safety chain engaging body member is configured to operatively handle a load of at least 30,000 pounds.

22. The tie down apparatus of claim 16, wherein the handle is generally aligned with the safety chain engaging body member when the apparatus is engaged to the receiving members.

23. The tie down apparatus of claim 22, wherein the handle further comprises a channel configured to receive a surface of the safety chain engaging body member therein as the second mounting member is operatively engaged to the second receiving member.

* * * * *